Jan. 13, 1970 C. H. BARNES 3,489,304
REFUSE COLLECTION VEHICLE
Filed July 1, 1968 5 Sheets-Sheet 1
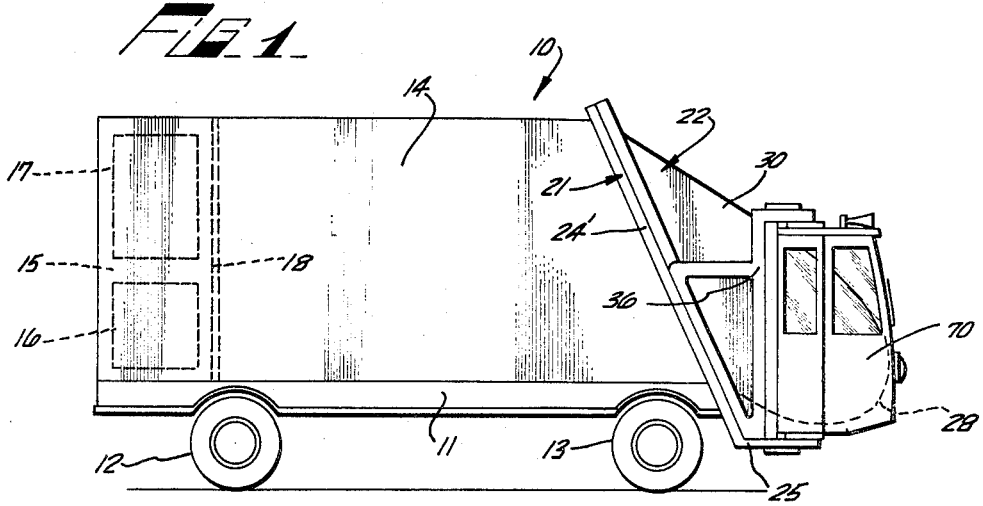
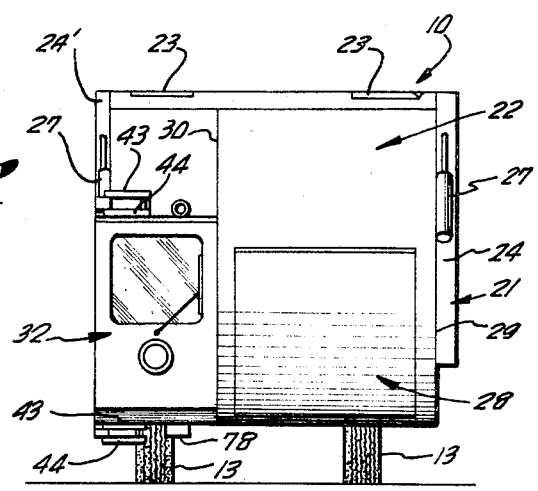
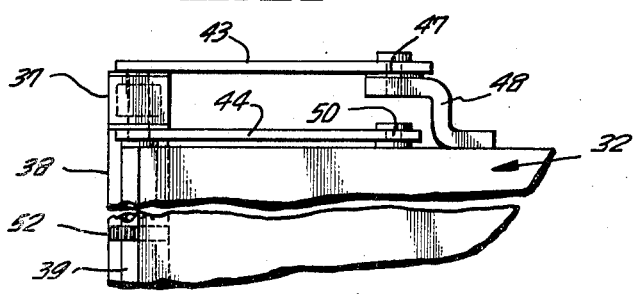
INVENTOR.
CHARLES H. BARNES
BY
Christie, Parker & Hale
ATTORNEYS.

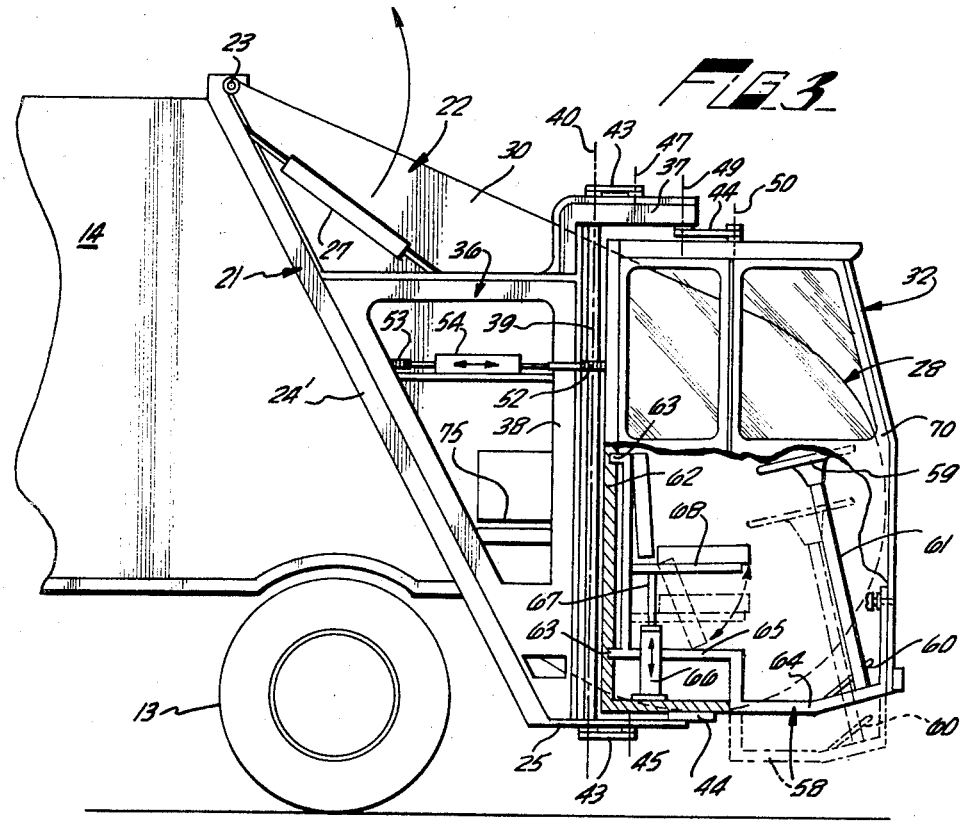

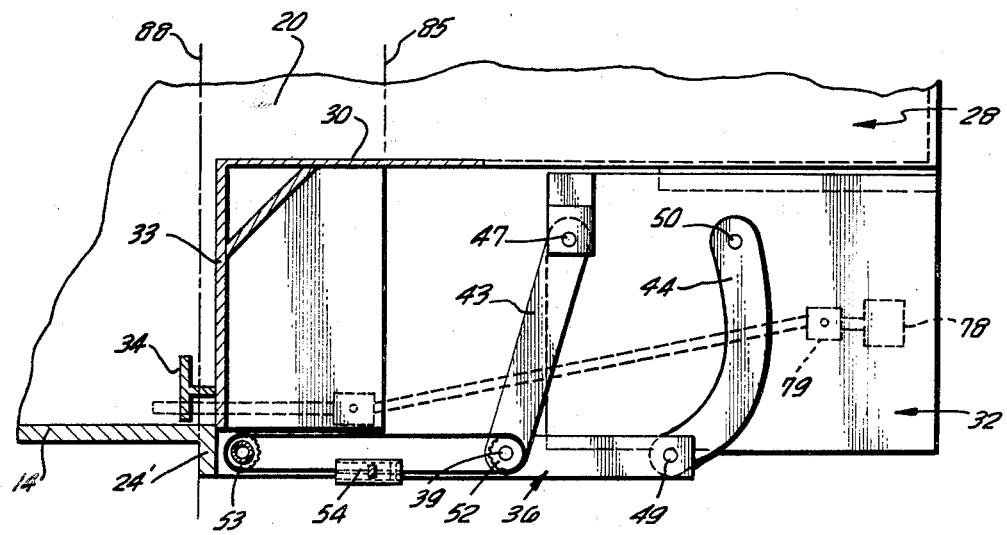
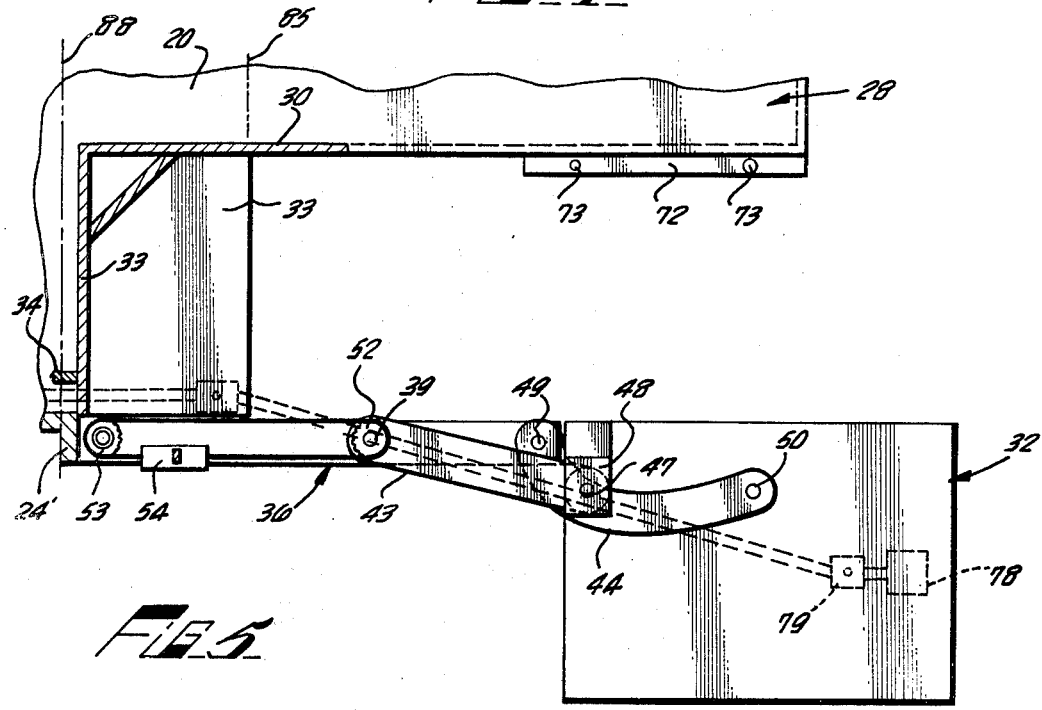

Jan. 13, 1970     C. H. BARNES     3,489,304
REFUSE COLLECTION VEHICLE
Filed July 1, 1968     5 Sheets-Sheet 4
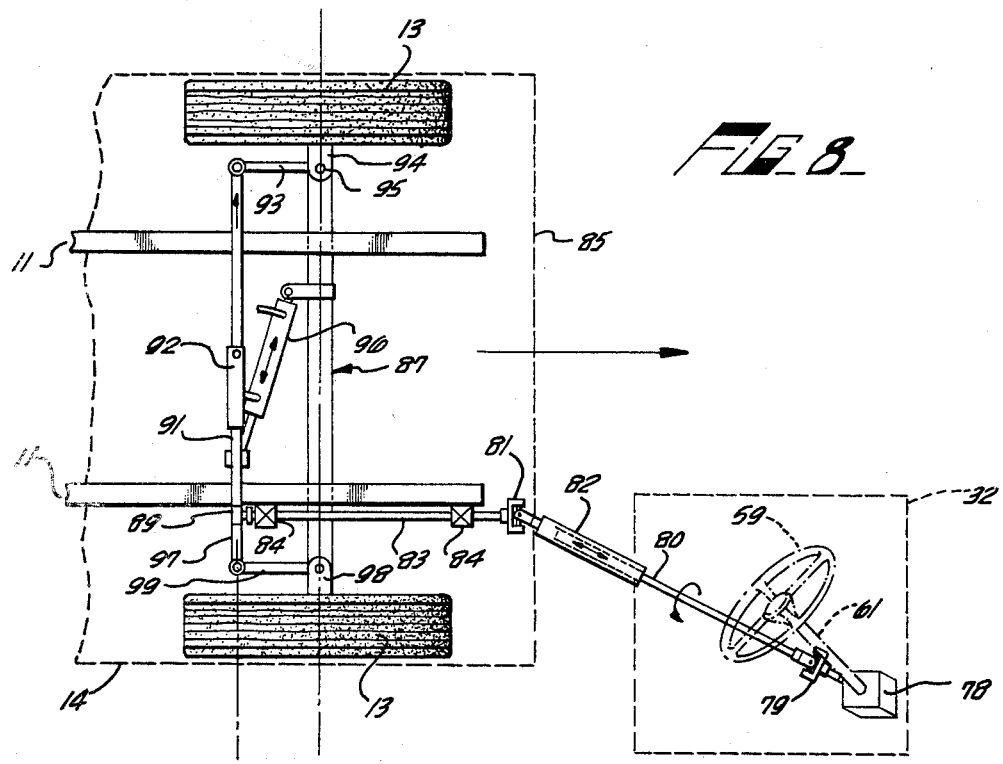
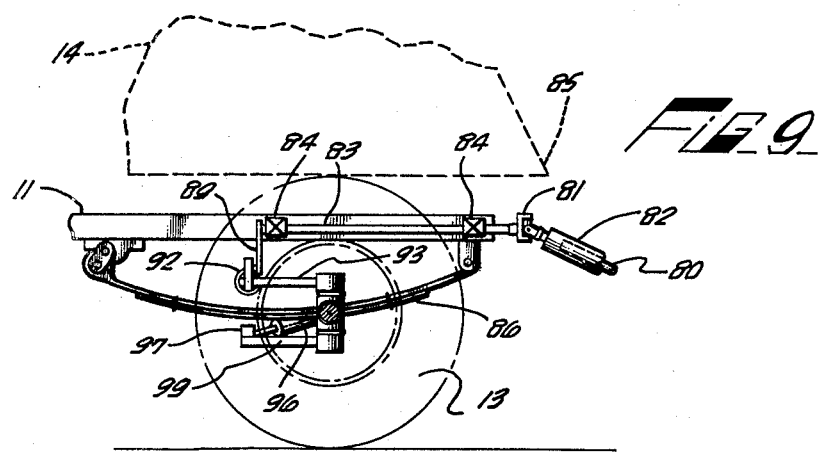
INVENTOR.
CHARLES H. BARNES
BY
*Christie, Parker & Hale*
ATTORNEYS.

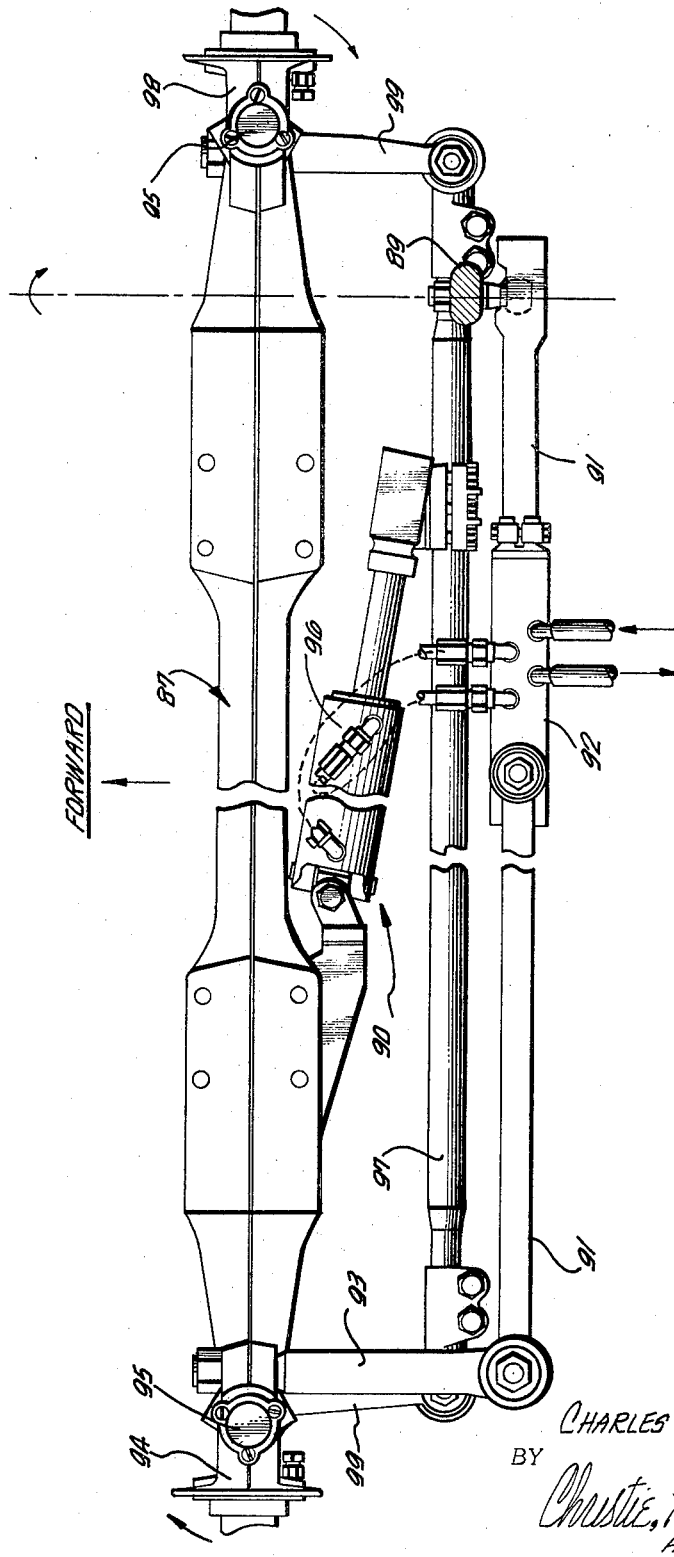

3,489,304
REFUSE COLLECTION VEHICLE
Charles H. Barnes, 2766 E. Glenoaks Blvd.,
Glendale, Calif. 91206
Continuation-in-part of application Ser. No. 501,412,
Oct. 22, 1965. This application July 1, 1968, Ser.
No. 741,638
Int. Cl. B60p 1/00; B62d 27/00, 29/00
U.S. Cl. 214—500         14 Claims

ABSTRACT OF THE DISCLOSURE

A refuse collection vehicle in which preferably the only control cab for the vehicle normally is located to the side of a hopper provided in a gate assembly which extends across the width of the vehicle, the normal location of the cab being in a recess provided therefor in the gate assembly. The gate assembly is hinged to the bin so that the bin may be emptied of collected refuse through an opening normally closed by the gate assembly, and the cab is movably mounted to the vehicle chassis for movement out of the way of the gate assembly. A positive mechanical connection is maintained at all times between the steering wheel in the cab and the steerable wheels of the vehicle.

CROSS-REFERENCE TO RELATED APPLICATIONS

This application is a continuation-in-part of copending application Ser. No. 501,412 filed Oct. 22, 1965 (now Patent 3,391,811), which was a continuation-in-part of application Ser. No. 284,958 filed June 3, 1963, now Patent 3,233,765.

BACKGROUND OF THE INVENTION

Field of the invention

This invention pertains to a refuse collection vehicle and the like in which a single vehicle control cab is movably mounted to the vehicle chassis and in which a positive mechanical connection always exists between the steering mechanism of the cab and the steerable wheels of the vehicle.

Review of the prior art

There are many different configurations of refuse collection vehicles in common use today in the United States and elsewhere. These vehicles, with one exception noted below, have the common feature that the only control cab or station from which the vehicle may be driven is located at a fixed position on the vehicle chassis, and usually the cab location is at the end of the vehicle opposite from the end at which refuse and the like is loaded onto or into the vehicle. For this reason such vehicles are inefficient to operate in their areas of special utility since the driver, and his helper, if any, must walk from the cab to the opposite end of the vehicle and back to the cab at each stop of the vehicle at which refuse is collected, with the result that much valuable time of the driver and the helper is wasted in needless motion.

My prior patents describe refuse collection vehicles in which an auxiliary control station for the operator is located adjacent the refuse collection hopper for movement with the hopper as a part of a gate assembly which normally closes a refuse collection bin. My prior patents also describe vehicles in which the sole control station in the vehicle is provided as a part of the movable gate assembly (Patent 3,391,811 and West German Auslegeschrift 1,022,156, the latter being the exception noted above), as well as vehicles in which either an auxiliary control station or the sole vehicle control station is mounted to the vehicle chassis adjacent the refuse collection hopper for movement relative to the chassis independently of the hopper and its gate assembly. These vehicles all have the advantage of locating the operator's control cab or station close to the hopper so that, on a refuse collection route, the time and energy of the operator, who also functions to load refuse onto the vehicle, might be used most efficiently. Time and motion studies have demonstrated the economic advantages of these vehicle configurations over more conventional refuse collection vehicles.

The vehicle configurations described in my prior patents, and in the German reference, all relied upon hydraulic steering connections between the auxiliary or sole control station and the steerable wheels of the vehicle. Hydraulic steering connections have been described for these vehicle configurations since it was desired that the pertinent control station be movable relative to the vehicle chassis, and hydraulic connections can readily accommodate such relative movement. Sole reliance upon hydraulic steering connections, however, is potentially hazardous since if hydraulic power is lost or a hydraulic control line should break, the ability to steer the vehicle is lost and the movement of the vehicle cannot be controlled.

SUMMARY OF THE INVENTION

This invention provides a refuse collection vehicle in which the human time and motion conserving advantages of the vehicles according to my prior patents are obtained, and in which a positive mechanical steering mechanism (rather than a hydraulic steering connection) is always present regardless of the position of a movable control cab relative to the vehicle chassis. This invention makes maximum use of readily available and proven automotive steering gear components. Thus, there results a much improved refuse collection vehicle which is economical to manufacture, and which is economical and safe to operate both on local refuse collection routes and in transit at high speeds to and from local collection routes. The vehicle of this invention is structurally simple, and thus is economical to maintain.

Generally speaking, this invention provides a refuse collection vehicle which has a wheeled chassis. At least a pair of the wheels supporting the vehicle are steerable. A refuse storage bin is mounted to the chassis and defines essentially the maximum width of the vehicle. The bin has an opening at one end of the chassis, and a gate assembly, configured to close the bin opening, is hingeably mounted for movement into and out of closure relation to the bin opening. Hopper means are provided in the gate assembly for transferring refuse and the like into the bin from externally of the vehicle. The hopper means is located closer to one side of the vehicle than to the other side of the vehicle. The vehicle also includes a control cab fitted with a steering wheel. The control cab is mounted for movement between a first position located adjacent the portion of the hopper means which is disposed toward the other side of the vehicle, and a second position located outwardly of the other side of the vehicle. Means are provided for moving the control cab between its first and second positions. The vehicle further includes mechanical means which are operatively coupled between the cab steering wheel and the steerable vehicle wheels regardless of the position of the control cab for moving the steerable wheels in response to movement of the steering wheel.

The mechanical coupling between the cab steering wheel and the steerable vehicle wheels may include a hydraulically powered power steering mechanism of the type which provides a mechanical connection between the steerable wheels and the steering wheel in the event of loss of hydraulic power.

DESCRIPTION OF THE DRAWINGS

The above-mentioned and other features of this invention are more fully set forth in the following detailed description of a presently preferred embodiment of the invention, the description being presented with reference to the accompanying drawings, wherein:

FIG. 1 is a side elevation view of a vehicle according to this invention;

FIG. 2 is a front end elevation view of the vehicle shown in FIG. 1;

FIG. 3 is an enlarged and more detailed side elevation view of a portion of the structure shown in FIG. 1;

FIG. 4 is a simplified top plan view of the front right corner of the vehicle showing the movable control cab in one of its two limiting positions relative to the vehicle chassis;

FIG. 5 is a view similar to that of FIG. 4 showing the cab in its other limiting position relative to the vehicle chassis;

FIG. 6 is a fragmentary front elevation view of a portion of the cab movable support structure;

FIG. 7 is an enlarged fragmentary view of a portion of the mechanism which moves the cab;

FIG. 8 is a simplified plan view of the mechanical steering mechanism coupled between the cab and the steerable vehicle wheels;

FIG. 9 is a side elevation view of a portion of the structure shown in FIG. 8; and FIG. 10 is a detailed top plan view of the power steering mechanism connected to the front axle of the vehicle.

DESCRIPTION OF THE PREFERRED EMBODIMENT

FIG. 1 shows a refuse collection vehicle 10 which has a chassis 11 supported on rear wheels 12 and on steerable front wheels 13. A refuse collection bin 14 is mounted on the vehicle chassis. Within a rear bin compartment 15 is located an engine 16 for powering the vehicle and a drive mechanism 17 for moving a refuse ejection pusher plate 18 back and forth along the length of the bin. Pusher plate 18 normally is disposed rearwardly within the bin and, in such position, defines the boundary between compartment 15 and the refuse collection space of the bin.

The front end of bin 14 defines an opening 20 (see FIGS. 4 and 5) which extends across the entire width and height of the bin. The bin front opening is defined in a plane which is inclined to the length of the vehicle such that the front end of the top of the bin is located rearwardly of the front end 85 of the bin floor. A heavy structural framework 21 is mounted to the bin and the chassis. The framework extends around the bin opening along the sides and across the top of the bin opening to provide structural integrity to the bin and to provide a support for a gate assembly 22 which is hinged to framework 21 across the top of the bin. Bin 14 defines essentially the entire width of the vehicle. Side members 24 and 24' of framework 21, however, extend slightly outwardly from the side walls of the bin and define the maximum width of the vehicle as shown in FIG. 2. To maximize the storage capacity of the bin, it is desired that the width of framework side members 24 and 24' be as small as possible consistent with the structural loads which these members must support. FIG. 1 shows that right bin structural member 24' extends in the plane of the bin opening to below the vehicle chassis where it is fitted with a forward extension 25 disposed parallel to the length of chassis 11; extension 25 becomes a part of cab support frame 36, described below Gate assembly 22 is mounted to the bin by horizontal hinges 23 for movement into and out of closure relation to the bin and is arranged to completely close bin opening 20. The gate assembly is driven in such hingeable movement relative to the bin by extensible hydraulic ram assemblies 27 which are connected between framework side members 24 and 24' and the sides of the gate assembly. A refuse hopper mechanism 28 is carried by the gate assembly and has a right side wall 29 located just inwardly of left framework member 24. The hopper mechanism has a right side wall 30 which is disposed between and closer to the vehicle vertical center plane than to the inner side of right bin framework side member 24'. The spacing between the hopper mechanism left side wall and the left side of framework 21 is sufficient to accommodate a movable vehicle control cab 32 which normally is disposed forwardly of a flat plate 33 of the gate assembly.

FIGS. 4 and 5 show that plate 33 extends to the left essentially in the plane of bin opening 20 from the rear edge of hopper mechanism side wall 30 to just outwardly of the inner edge of bin framework member 24'. Accordingly, the hopper mechanism and plate 33 impart to the gate assembly sufficient width and height to completely close bin opening 20 formed when the gate assembly is in closure relation to the bin. The right gate assembly drive ram is connected between framework 21 and hopper mechanism side wall 29. The other gate assembly drive ram is connected along the right edge of the gate assembly between framework 21 and plate 33. A reinforcing structural member 34 is secured to the rear side of plate 33 inwardly of the right edge of the plate to impart to the right side of the gate assembly sufficient strength to accommodate the loads associated with operation of rams 27. When the gate assembly is closed, structural member 34 is actually disposed within the limits of bin 14.

The hopper mechanism provided in the vehicle illustrated in the accompanying drawings preferably is of the type described in U.S. Patents 2,879,906 and 2,975,913.

FIGS. 4 and 5 show that control cab 32 is movable between a position in which the cab abuts side wall 30 of the hopper mechanism and lies within the width of vehicle 10, and a position in which the cab is disposed outwardly of the width of the vehicle sufficiently to provide clearance for the gate assembly plate such that rams 27 may be operated to hinge the gate assembly upwardly out of closure relation to bin 14. When the cab is disposed in the position shown in FIG. 5 and the gate has been moved completely out of closure relation to the bin, mechanism 17 in bin compartment 15 is operated to drive pusher plate 18 forward in the bin, thereby to eject from the bin any refuse which has been collected therein by reason of normal refuse collection operations of the vehicle. In refuse collection operations, during which the gate assembly is closed relative to the bin, hopper mechanism 28 functions to transfer refuse collected by the driver of the vehicle, and any helper he might have, into the bin.

The vehicle control cab is mounted for the above-described movement by a rigid frame 36 which extends forwardly from framework side member 24' within the width of member 24'. Extension 25 of member 24' is the lower horizontal support member for the cab articulation and suspension mechanism described below. Frame 36 includes an upper horizontal member 37 located above the top of the cab. Frame 36 also includes a vertical structural member 38 which extends between members 37 and 25. A rotatable shaft 39 is disposed forwardly of frame member 38 and is journalled at its opposite ends in frame members 37 and 25. Shaft 39 is rotatable about vertical axis 40.

A control cab articulation and suspension mechanism includes a pair of pivoted cantilever support arms 43 and 44 connected between structural element 37 and the top of the cab, and a like pair of support arms pivotally cantilevered from frame member 25 to a fixed floor 45 of the cab. Inasmuch as the arrangement of support arms 43 and 44 at the top of the cab is essentially identical to the arrangement of the corresponding arms at the bottom of the cab, only the arrangement of the arms at the top of the cab is illustrated and described in detail. One end of support arm 43 is secured to an extension of shaft 39 above frame member 37 so that rotation of the shaft produces angular movement of the support arm about axis 40. The other end of support arm 43 is pivoted at 47 to a bracket 48 secured to the roof of cab 32. Support arm 43 is disposed above frame element 37 so as to prevent interference between support arms 43 and 44 during a complete movement of the cab between the positions shown in FIGS. 4 and 5. Support arm 44 is pivoted to the underside of the forward end of frame member 37. At its other end, arm 44 is pivoted at 50 to the roof of cab 32.

A chain sprocket 52 (see FIGS. 4, 5 and 7) is secured to shaft 39 between the opposite ends of the shaft so that angular movement between the shaft and the sprocket is not possible. A second chain sprocket 53 is disposed in the plane of sprocket 52 and is rotatably mounted to cab support frame 36 adjacent the rear of the frame, as shown in FIGS. 4 and 5. A double-acting hydraulic ram assembly 54 is mounted to frame 36 in the plane of sprockets 52 and 53 and is aligned between the sprockets parallel to a line between the sprockets. A length of chain 55 extends from the piston of ram assembly 54 forwardly around sprocket 52, rearwardly to around sprocket 53 to its other end which is also connected to the piston of the ram assembly. Accordingly, by operation of ram assembly 54, chain 55 is moved so as to rotate shaft 39. Since support arms 43 are keyed or the like to the opposite ends of shaft 39, rotation of the shaft causes these arms to be driven in such a manner as to move the cab from its normal position shown in FIG. 4 to the position shown in FIG. 5.

FIG. 3 shows that control cab 32 extends a considerable distance forward of vehicle wheels 13 to provide clearance for the vehicle when used on a highway or when the vehicle is discharging refuse at a dump or the like; in these uses of the vehicle it is desirable that the lower extremities of the cab be located as far off the ground as is possible consistent with the structural requirements of this invention. On the other hand, when the vehicle is operating on a refuse collection route on residential streets, during which time the driver preferably functions as the sole member of the crew of the vehicle, it is desirable that the floor of the cab be located as close to the ground as possible so that the driver does not expend any more energy and time than is necessary in entering and leaving the cab before and after movement of the vehicle along the collection route. Accordingly, cab 32 includes an elevatable floor member 58 to which a steering wheel 59 for the vehicle is mounted by a steering column 61. Brake and accelerator controls 60 are also mounted to floor member 58 and are connected to the engine and to the brakes by push-pull flexible cables (not shown), for example. Floor member 58 is movably mounted to the rear wall 62 of the cab at vertically spaced locations 63. The floor member has a lower, largely horizontal portion 64 to which the steering column and the brake and accelerator control pedals are mounted, and a second rearward portion 65 which is disposed above cab fixed floor 45 and above floor portion 64. An extensible hydraulic ram is mounted to the cab fixed floor and has its piston 67 connected to the movable floor member preferably just rearwardly of a hingeable seat flap 68. The seat flap preferably is disposed in a horizontal position, shown in solid lines in FIG. 3, when the vehicle is operated on a highway, but may be folded down into the position shown in dashed lines in FIG. 3 when the vehicle is being operated on a refuse collection route where the operator must enter and leave the cab frequently.

Preferably, cab 32 is an enclosed cab fitted with a door 70. The cab door is arranged to close the right side of the cab when the movable floor structure is in its elevated position. Preferably, the door is hinged centrally of its width in a direction opposite to the direction it is hinged at its rear edge to the cab door opening.

As is apparent from the foregoing description, cab 32 is essentially cantilevered from support frame 36. The normal position of the cab is as shown in FIGS. 1, 2 and 4. To prevent unnecessary loads upon the bearings associated with the pivots for cab support arms 43 and 44, a support member 72 (see FIG. 5) is mounted to the forward portion of hopper mechanism 28 to engage the lower left edge of the cab and to support the cab when it is disposed in its normal position forwardly of gate assembly plate 33. Preferably, support member 72 contains a pair of holes 73 which cooperate with appropriate latch pins (not shown) operated from within cab 32 to secure the cab relative to the hopper assembly in the normal position of the cab.

A seat 75 for a driver's helper may be mounted to the back wall of cab 32 if desired, as shown in FIG. 3. A seat mounted at this location is accessible through open frame 36 and, because of the movement of the cab as illustrated in FIGS. 4 and 5, does not interfere with the movement of the cab in response to rotation of shaft 39.

Steering wheel 59 is connected via steering column 61 to a gear box 78 mounted to the underside of cab 32 (see FIGS. 2, 4, 5 and 8). Gear box 78 has an output shaft which is connected to one hub of a conventional automotive universal joint 79. A shaft 80 is connected between the other hub of joint 79 to a forward hub of a second universal joint 81. Shaft 80 includes an extensible spline 82 which permits variation of the lineal distance between universal joints 79 and 81, but which transmits the rotary motion of the output shaft of gear box 78 to a shaft 83 to which the rear hub of joint 81 is connected. Shaft 83 is mounted to chassis 11 in suitable bearings 84; alternatively, shaft 83 could be journalled to front axle 87 either inside or outside of spring 86. Preferably, bearings 84 are mounted to the right side of the rightmost one of the two major fore-and-aft structural members commonly encountered in a heavy duty automotive chassis. In any event, shaft 83 is mounted as far to the right of the width of chassis 11 as is possible consistent with steering movement of wheels 13 so that, when cab 32 is moved outwardly of the width of the vehicle, as shown in FIG. 5, no part, or as little a part of shaft 80 as possible, is disposed directly forward of the lower front edge 85 (see FIGS. 4 and 5) of bin opening 20.

Steering shaft 83 extends rearwardly of front vehicle axle 87 parallel to the elongate extent of the chassis. The axis of axle 87 is represented in FIGS. 4 and 5 by line 88. It will be observed that axis 88 is located rearwardly of bin lower front edge 85. It is also preferred, as illustrated in the drawings, that rear universal joint 81 be located rearwardly of bin opening edge 85. A pitman arm 89 is secured to and depends from the rear end of steering shaft 83. The pitman arm is a conventional automotive pitman arm.

FIG. 10 shows, in detail, that front vehicle axle 87 is a conventional automotive axle equipped with essentially a conventional automotive power steering mechanism 90.

Pitman arm 89 is connected by a ball joint to the right end of a transverse drag link 91 within the length of which is mounted a power steering control valve assembly 92. The left end of drag link 91 is pivotally connected to the rear end of a longitudinal drag link 93, the forward end of which is secured to left stub axle 94 adjacent king pin 95 of axle 87. A power steering power cylinder assembly 96 is connected in the conventional manner between the frame of axle 87 and a tie rod 97 which interconnects left stub axle 94 with right stub axle 98 via steering arm 99, as is conventional. Relative to conventional power steering front axles for automotive use, the axle and power steering assembly shown in FIG. 10, is like a conventional structure except that drag link 93 and the portion of drag link 91 between link 93 and control valve 92 replace the unitary drag link member encountered in conventional structures. In this regard, reference is had to drawing 37356, Garrison Manufacturing Company, Los Angeles, Calif. Garrison Manufacturing Company produces widely used power steering assemblies and front axles for automotive use. Control valve 92 provides a positive mechanical connection between pitman arm 89 and stub axle 94 in the event that the supply of hydraulic fluid to the control valve should be interrupted.

Hydraulic fluid is supplied under pressure to control valve assembly 92 from a conventional power steering hydraulic pump, not shown. The term "power steering" as used herein refers to power-assisted mechanical steering gear.

The structure shown in FIGS. 8, 9 and 10 is arranged so that rotation of steering wheel 59 in a clockwise direction causes vehicle 10 to turn tto the right.

It will be noted that in vehicle 10, control cab 32 is disposed at the right front corner of the vehicle instead of at the left front corner of the vehicle as in conventional in the United States. The location of cab 32 in the position illustrated is desirable in view of the basic use of the vehicle in refuse collection. In operation of the vehicle on a refuse collection route, especially on a route located in a residential area, the operator may drive the vehicle down the right side of the desired street. In so operating the vehicle, the operator is located adjacent the curb. Therefore, as the vehicle approaches a refuse collection stop, at which a resident has previously placed refuse to be collected adjacent the curb, the operator need merely stop the vehicle, disembark from the cab directly to the refuse to be collected, carry the refuse to hopper mechanism 28 and deposit the refuse therein, and return tthe empty refuse containers to curbside as he returns to the vehicle cab. In this manner, maximum beneficial use is made of the efforts of the operator. Accordingly, a single person may efficiently operate vehicle 10 to collect refuse, whereas at least two people, a driver and a refuse loader, would be required were the vehicle control cab located at the end of the vehicle opposite from refuse hopper 28.

Alternatively, cab 32 could be movably mounted at the left front corner of the vehicle, and the refuse hopper mechanism could be located in the right portion of the gate assembly. In such an arrangement, the cab could be extended sufficiently far forwardly of the hopper mechanism that a driver could enter and leave the cab through a door fitted in the right side wall of the cab. Where a vehicle is arranged in this manner, the driver could depart from the cab to curbside past the hopper, pick up refuse located at curbside, deposit the refuse in the hopper and return the containers to curbside, and return to the cab to drive the vehicle to the next collection point.

It was mentioned above that it is desired that steering shaft 83 be located as far to the cab side of the vehicle as possible consistent with the movement of steerable wheels 13. This arrangement is preferred so that shaft 80 and spline 82 are exposed as little as possible to refuse falling from bin 14 at the time when collected refuse is ejected from the bin by movement of pusher plate 18.

From the foregoing description, it is apparent that the present vehicle maintains all the advantages of vehicles described in my prior patents. This invention has advantage over these other vehicles in that the present vehicle incorporates a positive mechanical steering control system; the connections between the brake and accelerator pedals and the transmission control lever located in cab 32 with the respective controlled structures may be hydraulic connections instead of the mechanical push-pull connections mentioned above, but the use of hydraulic connections in these instances is not hazardous. The brakes may be fitted with a deadman control so that if the hydraulic connection between the control cab and the vehicle brakes is interrupted, the brakes automatically are applied. Similarly, a safety mechanism may be associated with the transmission such that if the hydraulic connection between the control cab and the transmission is interrupted, the transmission is automatically placed in a neutral condition; placement of the transmission in a neutral condition would also occur in the event that the hydraulic connection between the accelerator pedal and the engine were interrupted. Accordingly, it is apparent that vehicle 10, by reason of the mechanical connection between steering wheel 59 and steerable wheels 13, is always subject directly to the control of an operator of the vehicle.

The vehicle described above is ideally suited for efficient and economic operation by a single person. By reason of the configuration and arrangement of the vehicle, a single person can operate this vehicle to collect as much refuse as two people may collect using a conventional refuse collection vehicle in which the operator's station is located at the opposite end of the vehicle from refuse hopper 28. Moreover, since maximum use is made in vehicle 10 of conventional automative structures and equipment, it is apparent that vehicle 10 is economically competitive, in terms of first cost, with more conventional refuse collection vehicles.

It will be understood that the present invention has been described above with reference to a presently preferred embodiment of the invention. Therefore, the foregoing description has not been intended to be, nor should it be construed to be an exhaustive catalog of all forms which this invention reasonably and fairly may assume.

What is claimed is:

1. A refuse collection vehicle having a wheeled chassis, at least a pair of the wheels supporting the chassis being steerable, a refuse storage bin mounted to the chassis and defining essentially the maximum width of the vehicle, a gate assembly configured to close one end of the bin, means hingeably mounting the gate assembly for movement into and out of closure relation to the bin, a vehicle control cab including a steering wheel, means located essentially within the width of the vehicle as defined by the bin mounting the control cab for movement between a normal position located within the width of the vehicle so as to impair movement of the gate assembly out of closure relation to the bin and a position located outwardly of the width of the vehicle in which the gate assembly is unhindered from movement into and out of closure relation to the bin, and mechanical means operatively coupled between the steering wheel and the steerable vehicle wheels regardless of the position of the control cab for moving the steerable wheels in response to movement of the steering wheel.

2. A refuse collection vehicle having a wheeled chassis, at least a pair of the wheels supporting the chassis being steerable, a refuse storage bin mounted to the chassis and defining essentially the maximum width of the vehicle, a gate assembly configured to close the bin at one end of the vehicle, means hingeably mounting the gate assembly for movement into and out of closure relation to the bin, hopper means in the gate assembly for transferring refuse and the like from externally of the vehicle into the bin, the hopper means being located in the gate assembly more proximate to one side of the vehicle than to the other, a vehicle control cab including a steering wheel, means mounting the control cab for movement between a first position located adjacent the portion of the hopper means disposed toward the vehicle other side and a second position located outwardly of said other side of the vehicle, means for moving the control cab between the first and second positions thereof, and steering means providing a positive mechanical coupling between the steering wheel and the steerable vehicle wheels regardless of the position of the control cab for moving the steerable wheels in response to movement of the steering wheel.

3. A vehicle according to claim 2 wherein the bin is open at one end of the chassis across substantially the entire vertical and transverse extents of the bin.

4. A vehicle according to claim 2 wherein the means mounting the cab is located essentially within the maximum width of the vehicle as defined by the bin.

5. A vehicle according to claim 4 wherein the gate assembly is hingeably connected to the top of the bin, and the cab is mounted for translatory movement about a vertical axis disposed laterally of the gate assembly within the width of the vehicle.

6. A vehicle according to claim 4 wherein the gate assembly is hingeably connected to the top of the bin, and the gate assembly defines a recess laterally of the hopper mechanism, the cab occupying the recess in the first position thereof.

7. A vehicle according to claim 6 wherein said one end of the vehicle is the front end thereof, and the forward portion of the cab in the first position thereof lies essentially the same distance forwardly of the bin as does the forward extent of the gate assembly in the closed position thereof.

8. A vehicle according to claim 4 wherein said other side of the vehicle is the right side thereof.

9. A vehicle according to claim 2 wherein the steering means comprises an extensible universally jointed shaft coupled between the steering wheel and the steerable wheels.

10. A vehicle according to claim 9 wherein said shaft has a portion thereof journalled to the chassis proximate said other side of the vehicle.

11. A vehicle according to claim 10 wherein said shaft portion is mounted to the chassis sufficiently proximate the other side of the vehicle that the shaft does not lie forwardly of the bin when the cab is located in its second position.

12. A vehicle according to claim 2 wherein the steering means includes a power assist mechanism of the type which provides a mechanical connection between the steering wheel and the steerable wheels in the event that motive power to the power assist mechanism is unavailable.

13. A vehicle according to claim 2 wherein the cab includes an elevatable floor, movable for varying the effective clearance between the cab and a road surface and the like, to which the steering wheel is mounted.

14. A vehicle according to claim 2 wherein the cab consists of the sole operator's control station for the vehicle.

References Cited

UNITED STATES PATENTS 3,398,984  8/1968  Ajero _____ 296—28

FOREIGN PATENTS 1,502,834  10/1967  France.

ALBERT J. MAKAY, Primary Examiner

U.S. Cl. X.R.

296—28